(12) United States Patent
Zhang et al.

(10) Patent No.: US 7,717,473 B1
(45) Date of Patent: May 18, 2010

(54) DUAL WALLED TRANSFER TUBE

(75) Inventors: Geoffrey R. Zhang, Van Nuys, CA (US); Jose Alandy, Camarillo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 413 days.

(21) Appl. No.: 11/830,095

(22) Filed: Jul. 30, 2007

Related U.S. Application Data (60) Provisional application No. 60/889,996, filed on Feb. 15, 2007.

(51) Int. Cl.
*F16L 27/00* (2006.01)

(52) U.S. Cl. ............ 285/121.7; 285/121.1; 285/123.15; 285/145.3; 285/263; 285/302

(58) Field of Classification Search ............... 285/121.1, 285/121.2, 121.7, 123.15, 145.3, 146.1, 146.2, 285/146.3, 261, 263, 302
See application file for complete search history.

(56) References Cited

U.S. PATENT DOCUMENTS

| | | | |
|---|---|---|---|
| 2,616,728 A | 11/1952 | Pitt | |
| 3,306,636 A | 2/1967 | Hereth | |
| 4,039,208 A | 8/1977 | Pernet et al. | |
| 4,784,410 A | 11/1988 | Pepper et al. | |
| 4,850,616 A | 7/1989 | Pava | |
| 5,069,487 A | 12/1991 | Sheppard | |
| 6,056,329 A | 5/2000 | Kitani et al. | |
| 6,299,217 B1 | 10/2001 | Saito et al. | |
| 6,854,486 B2 | 2/2005 | Challender | |
| 2005/0012329 A1 | 1/2005 | Brown | |
| 2007/0051404 A1 | 3/2007 | Challender et al. | |

FOREIGN PATENT DOCUMENTS

| | | |
|---|---|---|
| EP | 0187915 | 1/1986 |
| GB | 1244927 | 9/1971 |
| GB | 1244928 | 9/1971 |
| GB | 1265791 | 3/1972 |
| WO | WO 00/39496 | 7/2000 |

*Primary Examiner*—James M Hewitt
*Assistant Examiner*—Gwendolyn D Fournet
(74) *Attorney, Agent, or Firm*—Robert J. Clark (57) ABSTRACT

A dual walled transfer tube connecting two sub-flow systems and conveying the system fluid from one subsystem to another when there are large radial and axial movements or offsets between the connecting ends of the subsystem. The dual walled transfer tube has a fitting at either end and a single ball joint proximate each fitting to allow the transfer tube to accommodate changes in radial position of the fittings. The dual walled transfer tube utilizes a main inner fluid passage and an outer secondary fluid passage, each fluid passage having a slip joint to allow the transfer tube to accommodate changes in axial length between the fittings.

14 Claims, 6 Drawing Sheets

DUAL WALLED TRANSFER TUBE

CROSS-REFERENCE TO RELATED APPLICATIONS

The present application claims the benefit of U.S. Provisional Application Ser. No. 60/889,996, filed Feb. 15, 2007.

TECHNICAL FIELD

The present invention relates to a fluid transfer tube having the ability to adjust to changes in length as well as changes in positions of its ends, and more particularly, to a dual walled transfer tube connecting two sub-flow systems and conveying the system fluid from one subsystem to another when there are large radial and axial movements or offsets between the connecting ends of the subsystem.

BACKGROUND

In the modern commercial and military airplane auxiliary fuel tank system, the fuel tank storage volume or the number of the fuel tanks will be adjusted according to the distance of the destination for the purpose of the saving fuel and increasing fuel usage efficiency. Transfer tubes are used to connect the auxiliary fuel tanks of commercial and military airplanes, and to transfer the fuel from one tank to another during flight. The use of traditional connection methods such as tubing, hose, and bellows is constrained due to the limited connection space between the tanks, the large diameter of the flow passage, and the large radial and axial movements caused by the manufacturing tolerances of the fuel tank equipment and the dynamic environment during the flight.

Traditional connection methods are simply not capable of meeting the function, safety, and reliability requirements with a large pressure surge and a constant large cyclic radial and axial motion within a small space. It would therefore be a significant advantage over the prior art to overcome the limitations of the prior art and to endure the harsh environment of modern commercial and military airplane auxiliary fuel tank systems.

SUMMARY OF THE INVENTION

At least one improvement over the prior art is provided by a transfer tube assembly comprising: a pair of fittings each having a main fluid port and a secondary port; a single ball joint adjacent each fitting; an inner, main fluid passage including a first slip joint; an outer, secondary fluid passage including a second slip joint; wherein the inner fluid passage is disposed entirely within the outer fluid passage; wherein the inner fluid passage fluidly connects the main fluid ports of the fittings; wherein the outer fluid passage extends between the pair of fittings and is fluidly connected to the secondary ports of the fittings.

At least one improvement over the prior is also provided by a transfer tube assembly for fluidly interconnecting two points in a fluid system, comprising: a pair of fittings having main fluid ports and secondary fluid ports, each of the fittings including a connection end and a ball portion having a convex spherical surface; a central tube assembly interposed between and fluidly interconnecting the fittings, the central tube assembly having a pair of ends, each end having an outer convex spherical surface and an inner concave spherical surface, the inner concave spherical surface engaging the convex spherical surface of the ball portion of the fitting; a cover member fixedly attached to each fitting and having a inner concave conical surface that engages the outer convex conical surface of the socket end of central tube assembly; the central tube assembly comprising a first tube member and a second tube member each having at least an inner tube portion and outer tube portion, the inner tube portion of the first tube member connected to the inner tube portion of the second tube member by a slip joint, the outer tube portions of the first tube member connected to the outer tube portion of the second tube member by a slip joint, the inner tube members combining to define an inner, main flow passage fluidly communicating with the main fluid ports in the fittings, the outer tube members combining to define an outer secondary fluid passage communicating with the secondary ports in the fittings.

At least one improvement over the prior is also provided by a fluid passage assembly comprising: a first fitting having a single ball joint proximate thereto; a second fitting distal from the first fitting, the second fitting having a single ball joint proximate thereto; an outer fluid passage extending between and through the first fitting and the second fitting and passing through each corresponding ball joint; and an inner fluid passage disposed entirely within the outer fluid passage, the inner fluid passage extending between the first fitting and the second fitting and through each corresponding ball joint; wherein the inner and outer fluid passage each include a slip joint.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
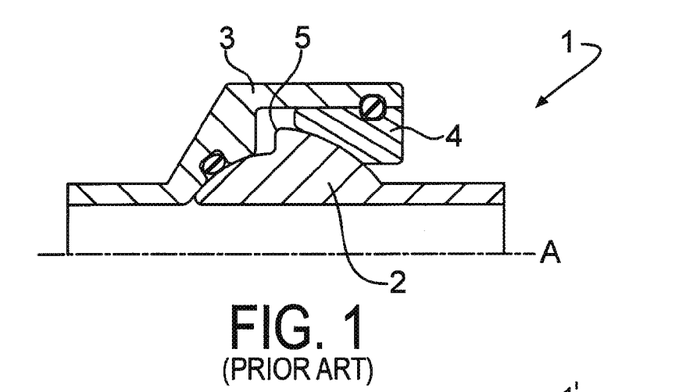
FIG. 1 is an axial cross-sectional view of half of a typical ball retained prior art ball joint.

As a preliminary matter, there are two types of ball joints involved in the dual wall fluid transfer tube design of the present invention. FIG. 1 shows a typical ball joint design 1 utilizing a ball 2 and socket 3, the socket including a retainer member 4. Both the socket 3 and the retainer member 4 have concave surfaces that engage the convex surface(s) of the ball 2 which may be formed as a single radius or as two radial surfaces having the same center as shown in FIG. 1. Of particular significance with this type of ball joint 1, the ball surface extends on both sides of its apex 5 defined herein as a tangent point on the ball 2 where the tangent line is parallel to the axis A of the joint. The socket 3 and retainer 4 combine to capture the ball 2 to prevent axial movement of the ball 2.

Figure 2:
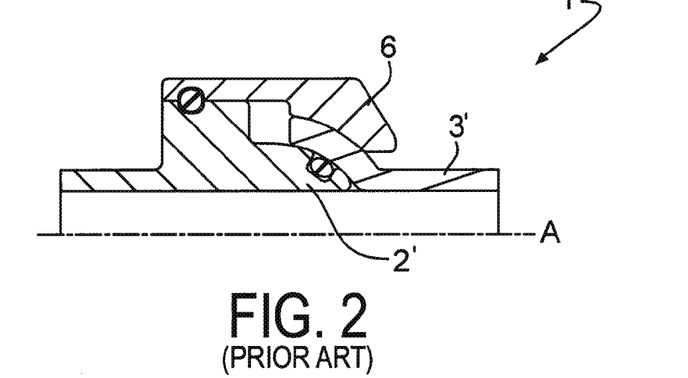
FIG. 2 is an axial cross-sectional view of half of a typical cover retained prior art ball joint.

FIG. 2 shows another type ball joint 1' which is used in the dual wall fluid transfer tube of the present invention. In this type of ball joint 1', the ball 2' and socket 3' are limited portions of a spherical surface such that there is no apex of the ball 2'. In order to capture the ball 2' to prevent axial movement of the ball 2', a cover 6 is utilized to engage the socket 3' on a side opposite the ball 2'. The cover 6 has a concave surface engaging a corresponding convex outer surface of the socket 3'.

While the function and working principle of both types of ball joints are identical, i.e. allow the ball to swivel on its center freely and constrain its ball center to translate in any directions, the ball joint of FIG. 2 can be made to take up significantly less space than the full ball joint of FIG. 1. In applications such as auxiliary fuel tanks, space is at a premium and a transfer tube utilizing the ball joint type of FIG. 2 provides the functional joint in a smaller package that—as shown in regard to the embodiments of the invention below—can be modified to provide additional benefits.

Figure 3:
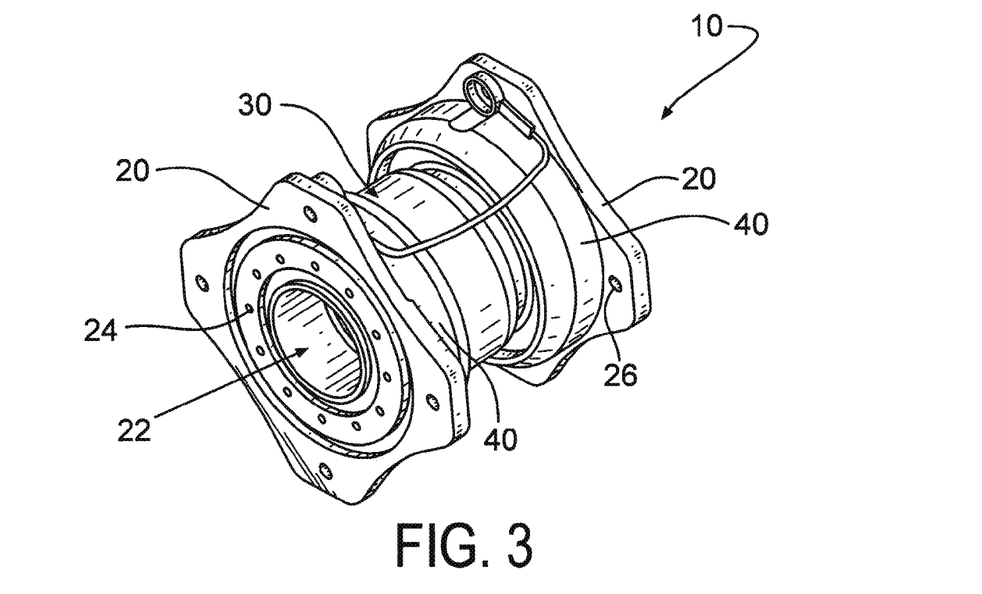
FIG. 3 is a perspective view of an embodiment of the dual wall transfer tube of the present invention.
Figure 4:
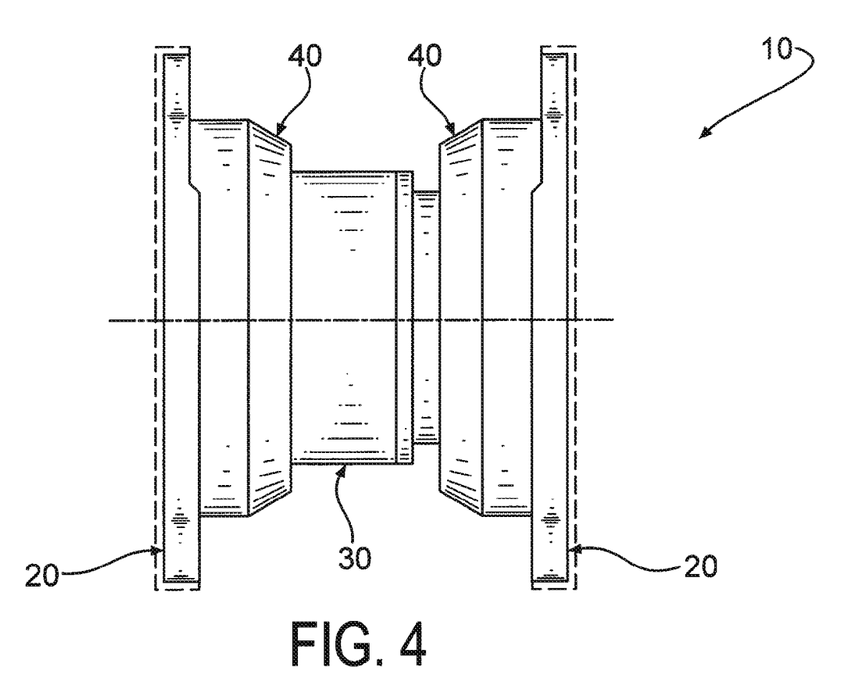
FIG. 4 is a side view of the embodiment of the dual wall transfer tube of FIG. 3.
Figure 5:
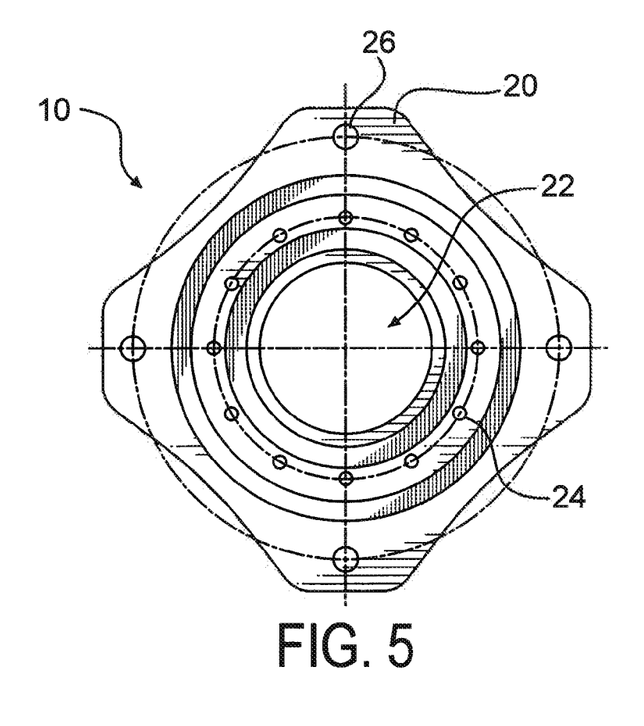
FIG. 5 is an end view of the embodiment of the dual wall transfer tube of FIG. 3.

Referring now to FIGS. 3-5, a general overview of an embodiment of the dual wall transfer tube 10 of the present invention is shown. The dual wall transfer tube 10 comprises a pair of fittings 20 each having a main fluid port 22 and a secondary port 24 and a central tube assembly 30 interposed between and fluidly interconnecting the fittings 20. The fittings 20 may also include one or more apertures 26 for mounting the dual wall transfer tube 10 between two fluid systems such as auxiliary fuel tanks (not shown). A single ball joint 40 is shown between each fitting 20 and the central tube assembly 30.

Figure 6:
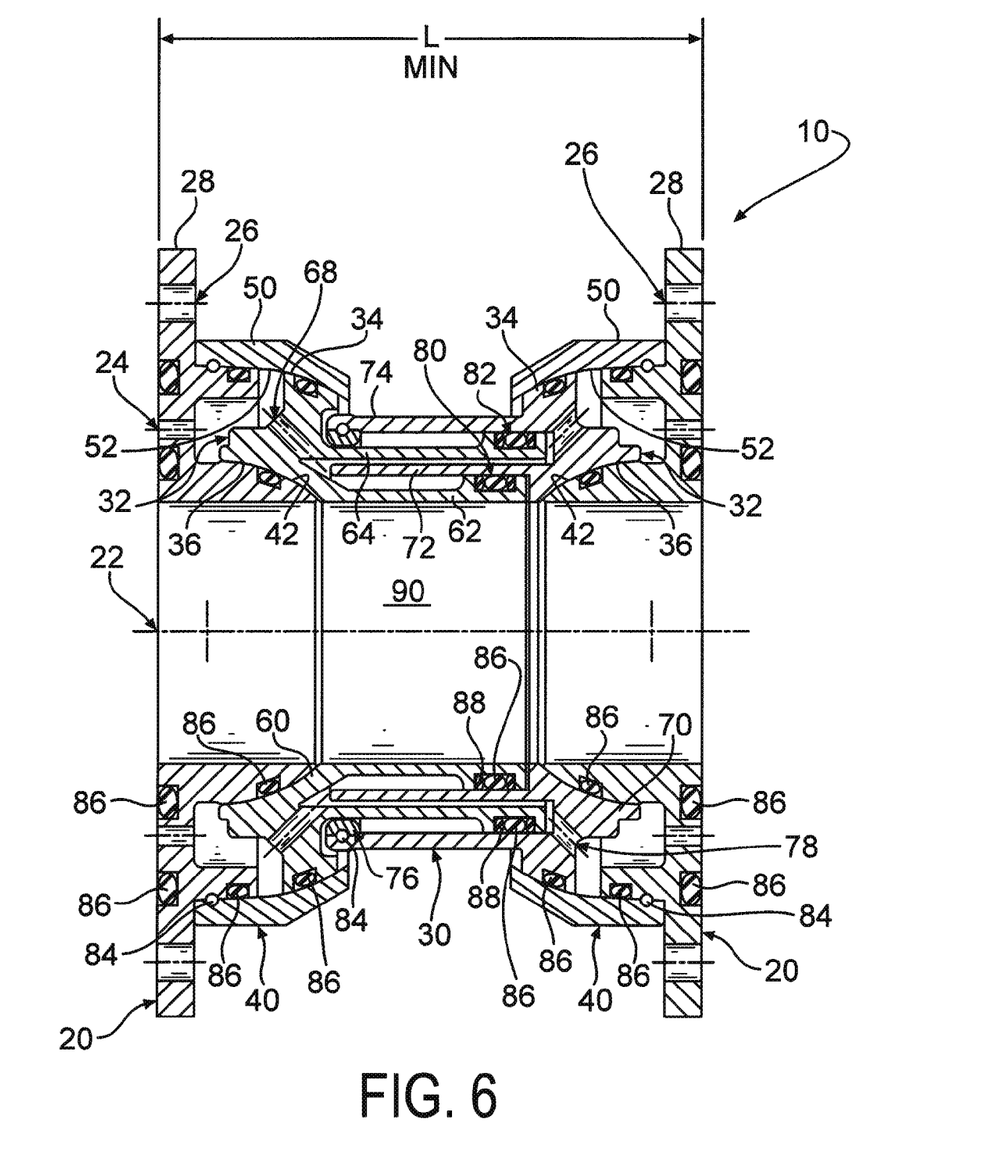
FIG. 6 is an axial cross-sectional view of the embodiment of the dual wall transfer tube of FIG. 3.

Referring now to FIG. 6, the embodiment of the dual wall transfer tube 10 is shown in an axial cross-section to provide more detail. The fittings 20 each include a connection end or flange 28 with a ball portion 42 extending therefrom and forming a convex spherical surface. The central tube assembly 30 has a pair of ends 32, each end having an outer convex spherical surface 34 and an inner concave spherical surface 36, the inner concave spherical surface 36 engaging the convex spherical surface 42 of the ball portion of the fitting 20. A cover member 50 is fixedly attached to each fitting 20, as shown the method of attachment is a retaining ring 84, however any suitable method of attachment is contemplated. The cover members 50 each have an inner concave conical surface 52 that engages the outer convex conical surface 34 of each corresponding end 32 of central tube assembly 30. The central tube assembly 30 further comprises a first tube member 60 and a second tube member 70 each having at least an inner tube portion 62, 72, and outer tube portion 64, 74, respectively. The inner tube portion 62 of the first tube member 60 is connected to the inner tube portion 74 of the second tube member 70 by a slip joint 80, the outer tube portion 64 of the first tube member 60 is connected to the outer tube portion 74 of the second tube member 70 by a slip joint 82, the inner tube portions 62, 72 combining to define an inner, main flow passage 90 (as best shown in FIG. 8) fluidly communicating with the main fluid ports 22 in the fittings 20, the outer tube portions 64, 74 combining to define an outer secondary fluid passage 92 (as best shown in FIG. 8) communicating with the secondary ports 24 in the fittings 20.

Referring again to FIG. 6, various seals 86 are used in order to help prevent leakage of the dual wall transfer tube 10. An O-ring seal 86 is positioned on the register face of the flange 28 between the main fluid port 22 and the secondary fluid ports 24. Another O-ring seal 86 is positioned on the register face of the flange 28 radially outward of the secondary fluid ports 24. An O-ring seal 86 is positioned between the cover 50 and the fitting 20. An O-ring seal 86 is also positioned between the ball 36 and the end 32 of the tube 30 and between the tube 30 and the cover 50. The slip joints 80, 82, each comprise an O-ring 86 between back up rings 88.

Figure 7:
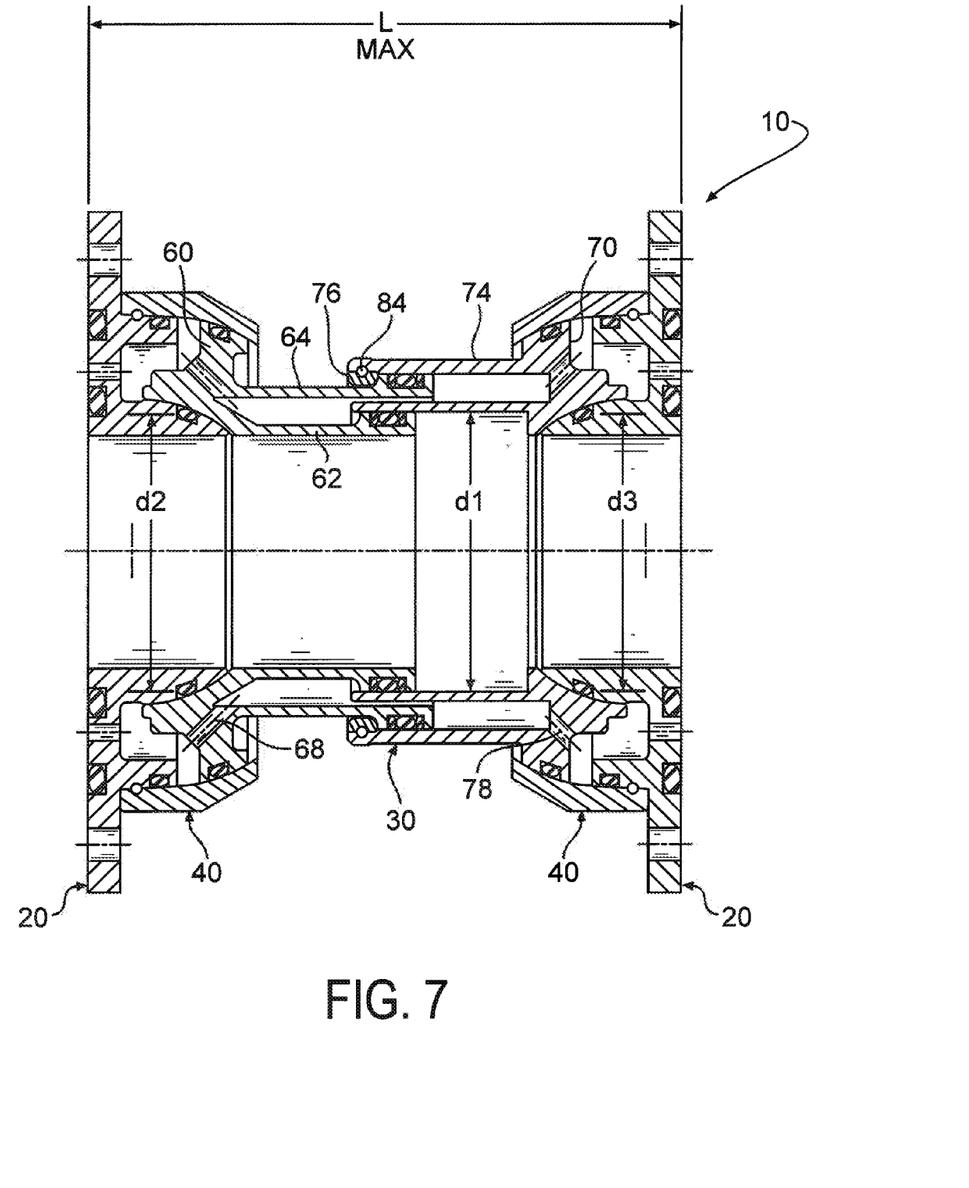
FIG. 7 is an axial cross-sectional view of the embodiment of the dual wall transfer tube of FIG. 3 in an extended configuration.

The dual wall transfer tube 10 is axially extendable from the retracted position shown as $L_{MIN}$ in FIG. 6 to the extended position shown as $L_{MAX}$ in FIG. 7. Referring now to FIG. 7, the outer tube portion 74 of the second tube member 70 has a stop 76 which engages a radially outward extending portion at the end of the outer tube portion 64 of the first tube member 60. The stop 76 may be formed as 180° halves that are joined in the end of outer tube portion 74 by the retainer wire 84 to prevent the transfer tube 10 from further extending when it reaches to its maximum extended length $L_{MAX}$. The retainer wire 84 may be positioned in a groove in the outer tube portion 74 and stop 76.

Figure 8:
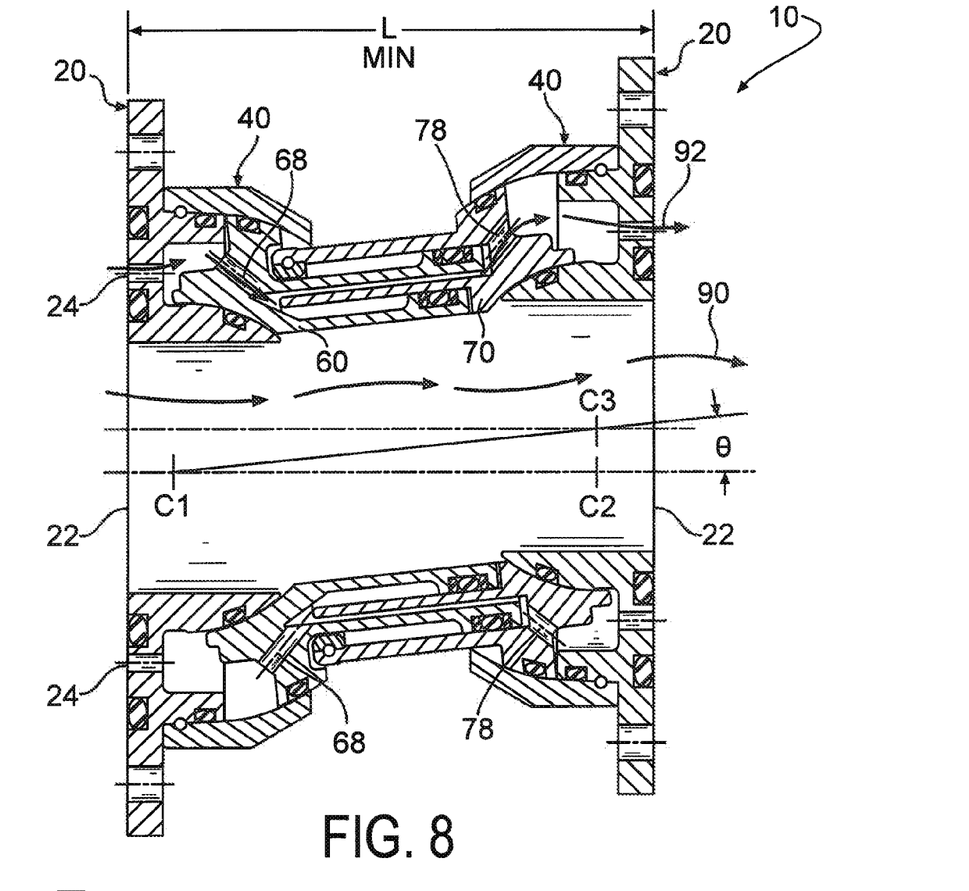
FIG. 8 is an axial cross-sectional view of the embodiment of the dual wall transfer tube of FIG. 3 in a radial offset configuration.

Referring now to FIG. 8, the single ball joint 40 proximate each end of the dual wall transfer tube 10 allow the device to move such that the fittings 20 are radially offset at an angle θ from each other. As shown, the center of the ball joint 40 on the left side of FIG. 8 is represented as C1. The center of the ball joint 40 on the right side of FIG. 8 is represented as C3 whereas element C2 represents where the center of the ball joint on the right side of FIG. 8 was prior to movement of the assembly 10. While the end surfaces of the fittings 20 are shown parallel to each other, there is no requirement that they be parallel. Also shown in FIG. 8 is the inner, main flow passage or fluid line 90 extending between and fluidly connecting the main fluid ports 22 of the fittings 20 and the outer, secondary flow passage or fluid line 92 extending between and fluidly connecting the secondary ports 24 of the fittings 24. Inner fluid passage 90 is disposed entirely within outer fluid passage 92. It is noted that outer fluid passage 92 includes at least one through hole 68 in the first tube member 60 and at least one through hole 78 in the second tube member 70. Through holes 68, 78 allow the use of a single ball joint to be used on either side of the dual wall transfer tube 10.

In the normal operating condition, fluid is not flowing through the secondary fluid passage 92. A purpose of dual wall design on the transfer tube 10 is that, in the event of a leak due to damage, contamination, or an incident during operation, the system leaking fluid will flow along the outer, secondary fluid passage to the sensor cavity (not shown) and the leaking will be detected by the sensor (not shown). The sensor will signal the electronic warning system and notify the pilots. The leaking fluid is still sealed inside the external wall of the outer secondary fluid passage 92. This is a redundant sealing mechanism.

Figure 9:
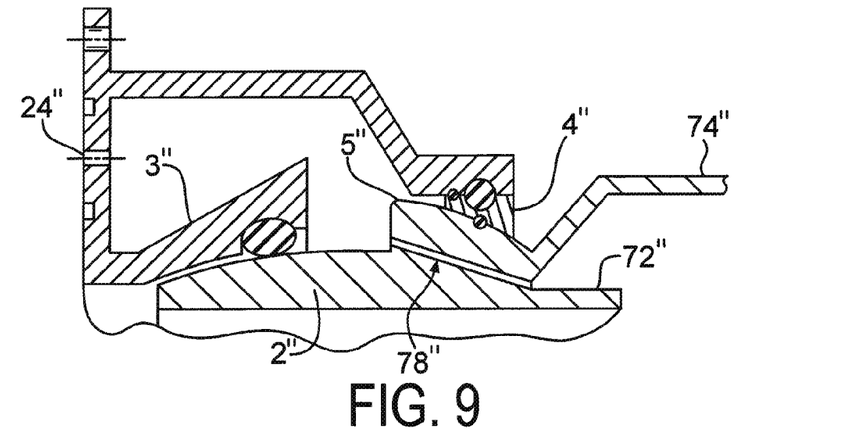
FIG. 9 is an axial cross-sectional view of another embodiment of the dual wall transfer tube of the present invention showing a ball retained ball joint having a secondary fluid passage passing through the ball portion of the joint.

While FIGS. 6-8 show details of an embodiment utilizing a ball joint fashioned on the ball joint of FIG. 2; the invention is not limited as such. Referring now to FIG. 9, a detail cross-sectional view of an alternate embodiment of the invention is shown utilizing a ball retained ball joint fashioned on the ball joint of FIG. 1. The embodiment of FIG. 9 comprises a ball 2" and socket 3", the socket including a retainer member 4". Both the socket 3" and the retainer member 4" have concave surfaces that engage the convex surfaces of the ball 2" which is shown having two radial surfaces having the same center. The ball surface extends on both sides of its apex 5" defined herein as a tangent point on the ball where the tangent line is parallel to the axis of the joint. The socket 3" and retainer 4" combine to capture the ball 2" to prevent axial movement of the ball 2". A secondary fluid passageway 78" is formed as a through hole in the ball 2" and is in fluid communication with secondary ports 24". Ball 2" is shown having tube portions 72" and 74" extending therefrom which would mate with corresponding tube members extending from a corresponding single ball joint of the distal fitting (not shown).

In assembling the dual wall transfer tube 10, it can be difficult to position the tube portions 62, 72 and 64, 74 in an intermeshing manner without damaging the seals 86. Tube portions 62, 72 and 64, 74 are of a configuration that is also difficult to manufacture, almost requiring the parts to be molded to a final form.

Figure 10:
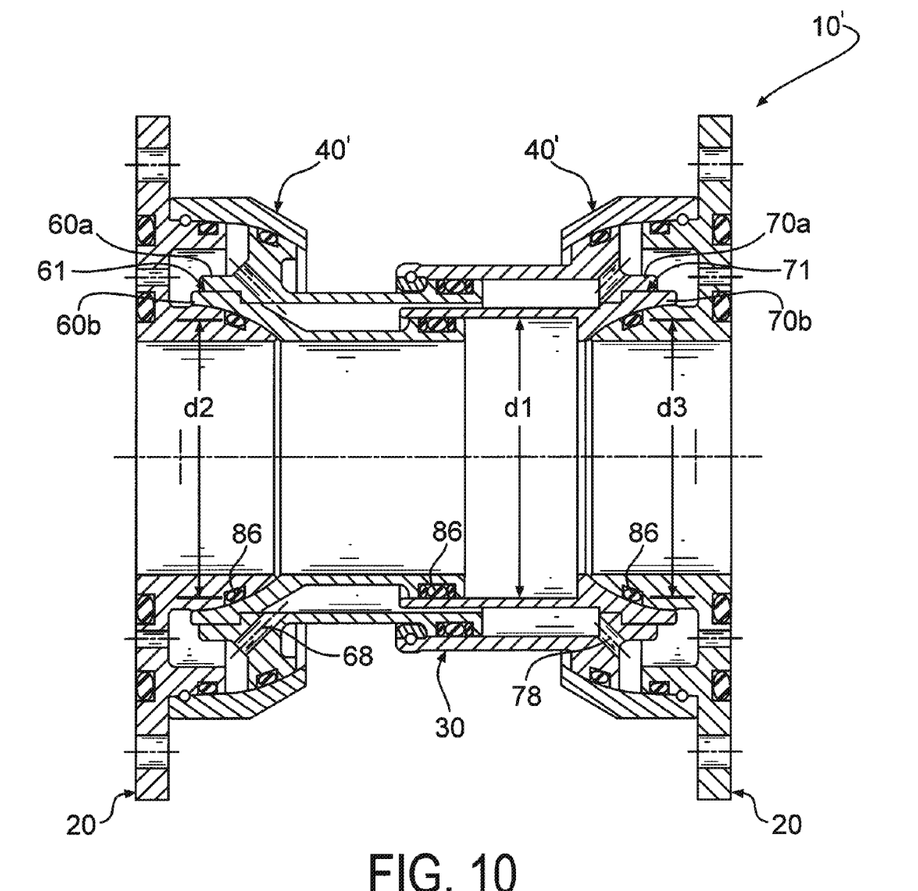
FIG. 10 is a is an axial cross-sectional view of yet another embodiment of the dual wall transfer tube of the present invention.

In the another embodiment of the invention as shown in FIG. 10, the dual wall transfer tube 10' comprises a two-piece first tubular member 60a and 60b and a two-piece second tubular member 70a and 70b. The remainder of the dual wall transfer tube 10' is the same as the dual wall transfer tube 10 of the first embodiment shown. Tubular members 60a and 60b are essentially a cut version of tubular member 60 and tubular members 70a and 70b are essentially a cut version of tubular member 70. The cut forms a stepped register surface 61 and 71. The stepped surface 61, 71 makes it so that tubular members 60a, 60b and 70a, 70b, when assembled, are fixed in position with respect to each other, and move as one piece, respectively, in the single ball joint 40' on either side of the dual wall transfer tube 10'. However, having the split tubular members allows the dual wall transfer tube 10' to be assembled from the outer tube—inward, instead of intermeshing the tubes. For example, the dual wall transfer tube 10' is assembled in the following manner: Engage the o-ring 86 and back up rings 88 of the outer tube slip joint 82 first. Then join the o-ring 86 and back up rings 88 of the inner tube slip joint 80. That way, the outer and inner o-rings and back up rings will be engaged into the slip joints in the sequence and not be intermeshing at the same time. This process will ease installing the inner tubes 60a and 70a and outer tubes 60b and 70b, and prevent o-rings 86 and their sealing surfaces from being damaged by intermeshing during the installation. Having the split tubular members 60a, 60b, 70a, 70b reduces the manufacturing difficulty level and cost, simplifies the fabricating process, and allows the o-ring 86 and back up rings 88 to install into the inner tube slip joint 80 easily.

In operating the dual wall transfer tube 10, 10', the operating pressure is applied in the main, inner fluid passage 90 only, because there is no fluid or pressure in the secondary outer fluid passage 92 during normal operating conditions. In order to minimize the pressure force applied to the ball joints 40, 40', the transfer tube sealing mechanism is designed so that the sealing diameters d1, d2 and d3 (see FIGS. 7 and 10) of the o-rings 86, as depicted therein, are almost the same. This means that the inner tubes 62, 72 are in a pressure balanced condition. The pressure force caused by the system fluid that is applied to the inner tubes 62, 72 and transferred to the ball joints 40, 40' of transfer tube 10, 10' is minimized. The ball joints 40, 40' will be very easy to swivel, which will dramatically reduce the surface wearing and galling at the sealing and joint register surfaces.

In a typical construction, provided as an example only and not intended to limit the invention in any way, the dual wall transfer tube 10, 10' is made of an aluminum alloy coated with hard anodize/PTFE, stainless steel (CRES 15-5PH, AMS5659 or CRES 300 Series or equivalent), or titanium alloy (GR 6AL-4V, AMS 4928 or equivalent). The swiveling and sealing surfaces of the dual wall transfer tube may be coated with Nedox SF-2, Niflor, or an equivalent surface hardening coating. The O-rings may be made of Florosilicone or rubber that is compatible with the system fluid to be used.

The back-up rings for the slip joints may be made of PTFE Teflon per MIL-R-8791/ASTM D1710. The stop can be provided as two half segments and may be made of aluminum alloy coated with hard anodize/PTFE, Alum Ni Bronze (AMS 4640), stainless steel (CRES15-5PH, AMS5659 or CRES 300 Series or equivalent), or titanium alloy (GR 6AL-4V, AMS 4928 or equivalent). The retainer wire for the stop and the cover may be made of CRES 300 series per ASTM A580, Inconel X-750 per AMS 5699, or equivalent.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. A transfer tube assembly comprising:
a pair of fittings each having a main fluid port and a secondary port;
a single ball joint proximate each fitting;
an inner, main fluid passage including a first slip joint;
an outer, secondary fluid passage including a second slip joint;
wherein the inner fluid passage is disposed entirely within the outer fluid passage;
wherein the inner fluid passage fluidly connects the main fluid ports of the fittings;
wherein the outer fluid passage extends between the pair of fittings and is fluidly connected to the secondary ports of the fittings;
wherein each ball joint comprises a single ball member having an interior diameter forming a portion of the inner fluid passage;
wherein each ball joint comprises a single socket having an inner concave surface engaging a convex spherical surface of the ball member;
wherein each ball joint comprises a cover member fixedly attached to one of the pair of fittings, the cover member engaging an outer convex spherical surface of the socket; and
the assembly further comprising a through hole through a portion of the socket member, the through hole forming a portion of the outer, secondary fluid passage.

2. The transfer tube assembly of claim 1, further comprising a retainer member having an inner concave surface engaging a convex spherical surface of the ball member.

3. The transfer tube assembly of claim 1, wherein the ball member of each ball joint includes a through hole forming a portion of the outer, secondary fluid passage.

4. The transfer tube assembly of claim 1 wherein each socket has an inner tube member and an outer tube member extending therefrom, the inner tube portions forming at least a portion of the inner, main fluid passage and the outer tube members forming at least a portion of the outer, secondary fluid passage.

5. The transfer tube assembly of claim 4, wherein each socket is formed in two pieces, an inner socket piece and an outer socket piece, wherein the inner socket piece comprises the inner concave surface of the socket and the inner tube portion, and the outer socket piece comprises the outer convex surface of the socket and the outer tube portion.

6. A transfer tube assembly for fluidly interconnecting two points in a fluid system, comprising:
- a pair of fittings having main fluid ports and secondary fluid ports, each of the fittings including a connection end and a ball portion having a convex spherical surface;
- a central tube assembly interposed between and fluidly interconnecting the fittings, the central tube assembly having a pair of ends, each end having an outer convex spherical surface and an inner concave spherical surface, the inner concave spherical surface engaging the convex spherical surface of the ball portion of the fitting;
- a cover member fixedly attached to each fitting and having a inner concave conical surface that engages the outer convex conical surface of the end of the central tube assembly;
- the central tube assembly comprising a first tube member and a second tube member each having at least an inner tube portion and outer tube portion, the inner tube portion of the first tube member connected to the inner tube portion of the second tube member by a slip joint, the outer tube portions of the first tube member connected to the outer tube portion of the second tube member by a slip joint, the inner tube members combining to define an inner, main flow passage fluidly communicating with the main fluid ports in the fittings, the outer tube members combining to define an outer secondary fluid passage communicating with the secondary ports in the fittings.

7. The transfer tube assembly of claim 6 further comprising a through hole through the first tube member and a second through hole through the second tube member, the through holes forming a portion of the outer, secondary fluid passage.

8. The transfer tube assembly of claim 6, wherein the first tube member comprises a first part separate from a second part, the first part comprising the inner tube portion of the first tube member and the second part comprising the outer tube portion of the first tube member.

9. The transfer tube assembly of claim 8 further comprising a through hole through a portion of the second part of the first tube member, the through hole forming a portion of the outer, secondary fluid passage.

10. The transfer tube assembly of claim 8, wherein the second tube member comprises a first part separate from a second part, the first part comprising the inner tube portion of the second tube member and the second part comprising the outer tube portion of the second tube member.

11. The transfer tube assembly of claim 9 further comprising a through hole through a portion of the second part of the second tube member, the through hole forming a portion of the outer, secondary fluid passage.

12. A fluid passage assembly comprising:
- a first fitting having a single ball joint proximate thereto;
- a second fitting distal from the first fitting, the second fitting having a single ball joint proximate thereto;
- an outer fluid passage extending between and through the first fitting and the second fitting and passing through each corresponding ball joint; and
- an inner fluid passage disposed entirely within the outer fluid passage, the inner fluid passage extending between the first fitting and the second fitting and through each corresponding ball joint;
- wherein the inner and outer fluid passage each include a slip joint;
- wherein each ball joint comprises:
    - a single ball member having an interior diameter forming a portion of the inner fluid passage;
    - a single socket having an inner concave surface engaging a convex spherical surface of the ball member;
    - and a cover member fixedly attached to one of the fittings;
- wherein the cover member engages an outer convex spherical surface of the socket member; and
- the assembly further comprising a through hole through a portion of each socket member, the through hole forming a portion of the outer, secondary fluid passage.

13. The fluid passage assembly of claim 12 wherein each socket has an inner tube member and an outer tube member extending therefrom, the inner tube portions forming at least a portion of the inner fluid passage and the outer tube members forming at least a portion of the outer fluid passage.

14. The transfer tube assembly of claim 13, wherein each socket is formed in two pieces, an inner socket piece and an outer socket piece, wherein the inner socket piece comprises the inner concave surface of the socket and the inner tube portion, and the outer socket piece comprises the outer convex surface of the socket and the outer tube portion.

* * * * *